United States Patent [19]

Hamilton, II et al.

[11] Patent Number: 6,098,181
[45] Date of Patent: Aug. 1, 2000

[54] SCREENING METHODOLOGY FOR OPERATING SYSTEM ERROR REPORTING

[75] Inventors: Rick Allen Hamilton, II; Chet Mehta, both of Austin; John Daniel Upton, Georgetown, all of Tex.

[73] Assignee: International Business Machines Corporation, Armonk, N.Y.

[21] Appl. No.: 08/827,746

[22] Filed: Apr. 10, 1997

[51] Int. Cl.[7] ................................................. G06F 11/00
[52] U.S. Cl. ............................................... 714/25; 714/47
[58] Field of Search ........................ 395/183.01, 183.02, 395/183.06, 187.07, 183.15, 185.01, 185.05; 371/5.1, 37.7, 51.1; 714/718, 25, 47, 26; 702/182

[56] References Cited

U.S. PATENT DOCUMENTS

| | | | |
|---|---|---|---|
| 4,209,846 | 6/1980 | Seppa et al. | 395/185.05 |
| 4,817,092 | 3/1989 | Denny | 395/183.02 |
| 4,970,726 | 11/1990 | Carn et al. | 395/183.01 |
| 5,210,860 | 5/1993 | Pfeffer et al. | 714/718 |
| 5,291,494 | 3/1994 | Bruckert et al. | 395/182.22 |
| 5,353,240 | 10/1994 | Mallory et al. | 395/183.01 |
| 5,408,645 | 4/1995 | Ikeda et al. | 395/183.13 |
| 5,506,955 | 4/1996 | Chen et al. | 714/47 |
| 5,684,945 | 11/1997 | Chen et al. | 714/25 |
| 5,737,497 | 4/1998 | Ballard | 395/183.02 |

*Primary Examiner*—Robert W. Beausoliel, Jr.
*Assistant Examiner*—Pierre E. Elisca
*Attorney, Agent, or Firm*—Robert V. Wilder; Volel Emile

[57] ABSTRACT

A method 201 and implementing system 101 are provided in which information processing system resources are monitored for variant conditions which may exceed acceptable tolerances. A continued count of failed readings is maintained 207 and only when the number of failed condition readings exceed a predetermined failure repetition constant 209, is the operating system notified to take appropriate action. When a resource previously identified as a failing resource, subsequently yields "good" readings 303, a resource identifier is moved from a "failing" status to an "intermittent failure" status 309. Thereafter, when successive "good" readings exceed a predetermined success repetition constant 319, the resource is removed from the "intermittent" status 321 and the monitoring process 201 is continued.

19 Claims, 3 Drawing Sheets

SCREENING METHODOLOGY FOR OPERATING SYSTEM ERROR REPORTING

FIELD OF THE INVENTION

The present invention relates generally to information processing systems and more particularly to an improved resource monitoring system and methodology.

BACKGROUND OF THE INVENTION

As computer systems and networked computer systems proliferate, and become integrated into more and more information processing systems which are vital to businesses and industries, there is a growing need to even more closely monitor the information processing resources in a system for the purpose of acquiring early detection of resource failures or conditions that may lead to resource failures or system failures. Resources of information processing systems include, but are not limited to, processing circuitry itself which is subject to varying temperature conditions and which may cause a system failure if an operating ambient temperature exceeds a predetermined temperature for a predetermined length of time. Other information processing resource conditions which are of concern and may be monitored for continuing "in-spec" conditions include system operating voltages, supply voltages, routine processing times, condition indicia such as visual alarm devices, etc.

In general, any condition that may be measured may also be monitored for compliance with applicable operating specifications.

At the same time, however, an information processing resource monitoring system must be designed not to report each and every variance from an ideal condition. If an error condition is relayed to an operating system (OS) every time the hardware reports an out-of-tolerance condition, several side effects may occur. A temporary or spurious error may cause an operating system to take undue actions, such as shutting down the power or alerting the user that service is required, even though the hardware, OS and data are not actually endangered. Also, in the event of repetitive, consecutive error measurements, the monitoring process may report each incident to the OS, which would reduce overall computer or system performance and fill error logs with redundant entries. Further, in the event that a hardware resource oscillates between good and bad readings, the same reporting behavior may occur, where the OS performance is degraded and related error logs are filled unnecessarily, albeit to a lessor extent than the continuous or repetitive error measurement situation cited above. In spite of the noted risks, it is imperative that the monitoring process report any errors which could result in computer or system failure, so that the OS can take appropriate action to prevent a data corruption or system crash which may be caused by a detectable hardware or other condition or failure.

Accordingly, there is a need for an enhanced method and processing apparatus which is effective to monitor information processing system resources and efficiently report significant variances while, at the same time, withholding such reports for minor and/or tolerable adverse conditions until such conditions reach a predetermined reportable level of intensity.

SUMMARY OF THE INVENTION

A method and apparatus is provided for monitoring the operating condition of processing resources within an information processing system. The processing resources are monitored and indicia are provided which are representative of at least first and second detected operating conditions of said resources. A record of the conditions is maintained and the record is automatically changed between at least first and second conditions in accordance with said detected operating conditions. In one embodiment, failing conditions are reported within the system to provide notification of failing resources and allow appropriate responsive action to be taken. Another feature enables the system to automatically detect when failing resources have been revived and to automatically remove revived "failing resources" from a Failing Resource Table. In another exemplary embodiment, when a failure condition is detected, further readings are taken. Only when a predetermined number of failure readings have occurred, a flag is set, the resource identifier is moved to a Failing Resource Table and the operating system is notified to take appropriate action. Thereafter, when a subsequent reading indicates that a "good" condition exists, and the resource is in the Failing Resource Table, and the notification flag had been set, then the resource is moved to an Intermittent Resource Table and the monitoring process continues. When the number of "good" readings exceeds a predetermined success repetition constant, for a resource in the Intermittent Resource Table, the resource is removed from the Intermittent Resource Table and the resource monitoring process is continued with the resources automatically being monitored and tracked with regard to good and failing resources.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
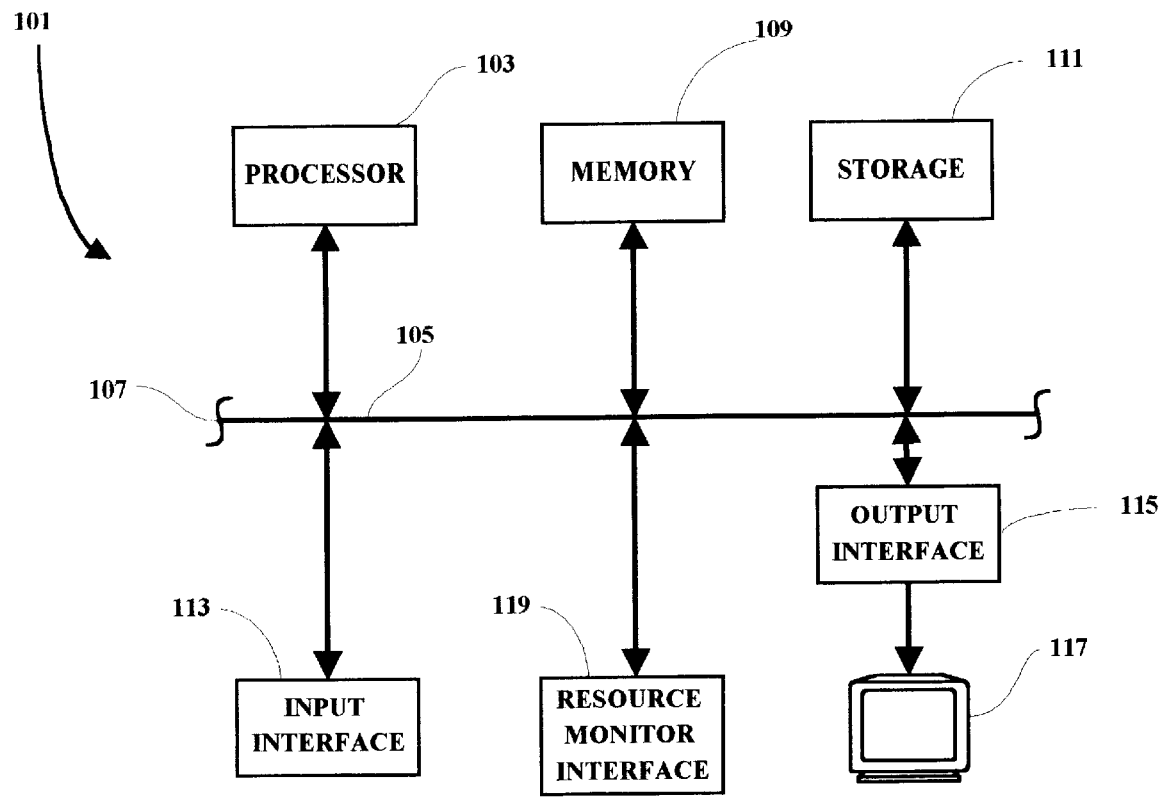
FIG. 1 is a block diagram of an exemplary computer system within which the present invention may be implemented.

With reference to FIG. 1, the various methods discussed herein may be implemented within a typical computer system or workstation 101. An exemplary hardware configuration of a workstation which may be used in conjunction with the present invention is illustrated and includes a processor unit 103, such as a conventional microprocessor, and a number of other units interconnected through a system bus 105, which may be any host system bus. It is noted that the processing methodology disclosed herein will apply to many different bus and/or network configurations. The bus 105 may include an extension 107 for further connections to other workstations or networks, other peripherals and the like. The workstation shown in FIG. 1 includes system memory 109, and system storage unit 111. The system bus 105 is also typically connected through a user or input interface 113 to which may be connected user input devices such as a keyboard device and/or a mouse or other pointing device. Other user interface devices may also be coupled to the system bus 105 through the user interface 113. Magnetic media or other media containing programming indicia may also be read into the storage unit 111 and executed from the memory device 109 or from the storage unit 111 as is well known in the art. An output interface unit 115 is shown connecting the bus 105 to one or more output devices such as the illustrated display device 117.

A resource monitor interface unit 119 is also connected to the bus 105 through which the monitor device 119 may access any of the devices in the system or in the network to which it may be connected. The disclosed resource monitoring methodology may be implemented in a hardware configuration within the monitor interface, or in a software implementation interfacing with the resource monitor interface to acquire access to the various signals and conditions which are being monitored. The monitoring methodology may also be implemented partially in software and partially in hardware with the software residing in system storage or loaded into memory or separate memory in the monitor interface 119. Since the workstation or computer system 101 within which the present invention is implemented is, for the most part, generally known in the art and composed of electronic components and circuits which are also generally known to those skilled in the art, circuit details beyond those shown in FIG. 1, will not be explained to any greater extent than that considered necessary as illustrated above, for the understanding and appreciation of the underlying concepts of the present invention and in order not to obfuscate or distract from the teachings of the present invention.

For purposes of describing the methodology implemented in accordance with the present invention, the present example includes a computer system such as that shown in FIG. 1. For purposes of the following description, "physical errors" are defined as any abnormal behavior endangering the computer hardware, OS integrity or data integrity. A "monitoring process" would include any operation running on any processor within the computer or system, and charged with monitoring the physical well being of the system using some "pass/fail" criteria. An example would be a program which routinely measures the voltages or temperatures and compares the results to some predetermined threshold. Also a "resource" refers to any hardware or device or condition that is being measured or capable of being measured.

The present example uses five data constructs, which ensure that the OS is notified of valid errors, but is not inundated with unnecessary and/or frivolous failure messages. The five constructs are: the "success repetition constant" or SRC; the "failure repetition constant" or FRC; the "notification flag"; the "Failure Resource Table"; and the "Intermittent Resource Table". The Failure Resource Table and the Intermittent Resource Table are tables stored in a memory or storage device.

All resources are assumed to be functioning devices before monitoring begins. In addressing temporary or spurious errors, the monitoring process uses the FRC as a guideline for reporting errors to the OS. The monitoring process does not notify the OS until a consecutive number of physical errors exceeding the FRC number have been detected. As an example, if a voltage reading is out of tolerance, the monitoring process will take multiple measurements to ensure that each occasion results in failing readings. If a successful reading is taken before the FRC is reached, the resource is not moved to a Failing Resource Table, the OS is not notified, and no further count is made. If, however, the number of consecutive errors against a resource exceeds the FRC, the resource and a failure code are placed in the Failing Resource Table. At that time, notification is made to the OS and further action is taken in accordance with OS guidelines. Upon notification, the monitoring resource also sets a notification flag for future reference.

In addressing the problem of a consistently bad resource resulting in an inundation of error reports to the OS, the monitoring process consults the notification flag. If the resource in the Failure Resource Table continues to report the same problem, the monitoring process will not re-report the problem to the OS because the internal notification flag will have been set.

In the situation where there is an intermittently good/bad resource, the success repetition constant SRC is implemented. Without the SRC and the accompanying Intermittent Resource Table, a series of bad readings or "failures", followed by a single good reading or "success", followed by another series of bad readings, will result in two distinct reports being made to the OS. To prevent this, once a resource in the Failing Resource Table reports a single "good" incident or a "success" in a reading, the resource identifier is moved from the Failing Resource Table to the Intermittent Resource Table. It will remain in the Intermittent Resource Table until a consecutive number of "good" readings or "successes" exceed the SRC. At that time the resource is removed from the Intermittent Resource Table. Once the error report is made to the OS, and the resource is moved to either the Failing Resource Table or the Intermittent Resource Table, it will not be re-reported. This prevents multiple reports issued for an oscillating resource.

Figure 2:
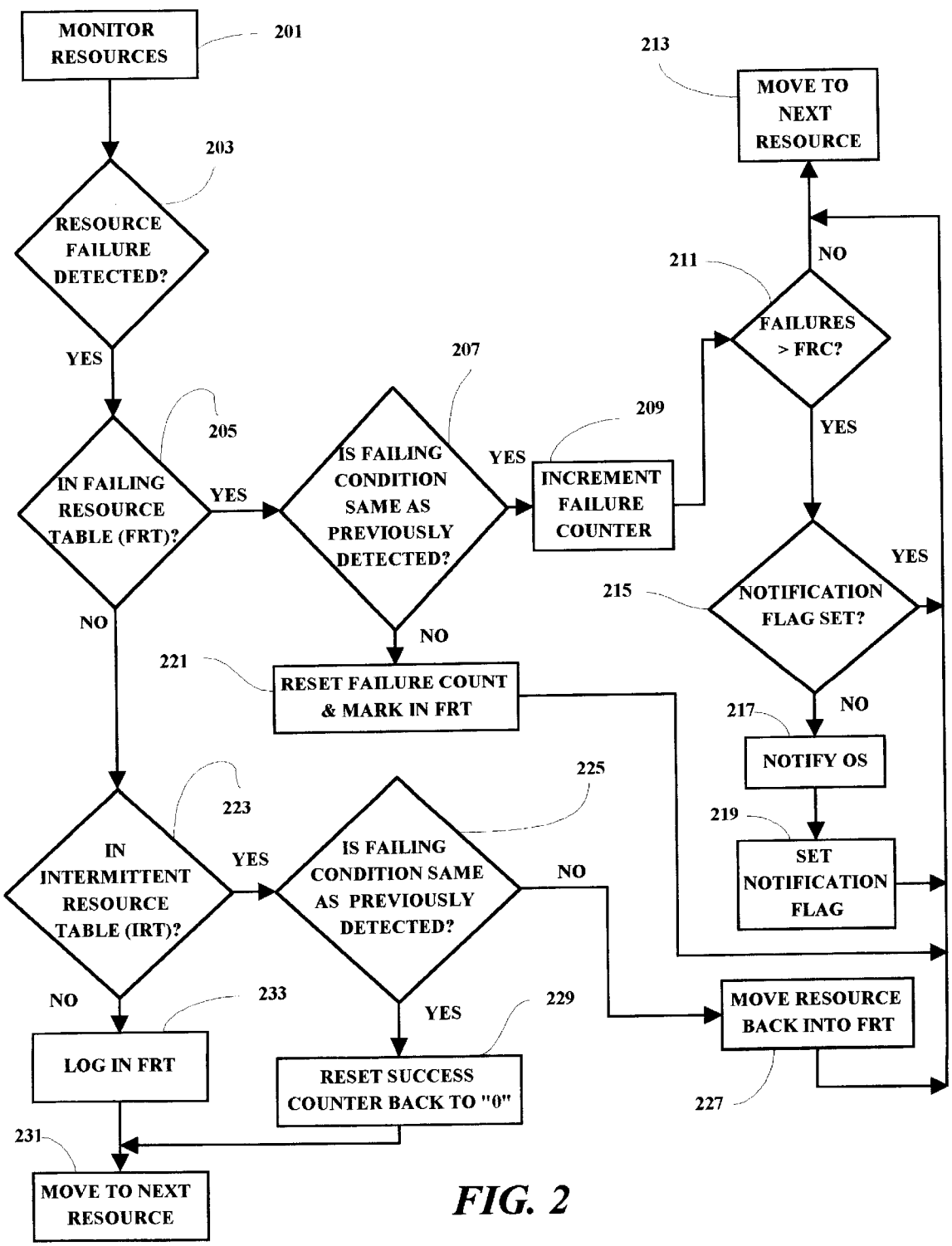
FIG. 2 is a flow chart illustrating one implementation of the disclosed methodology.
Figure 3:
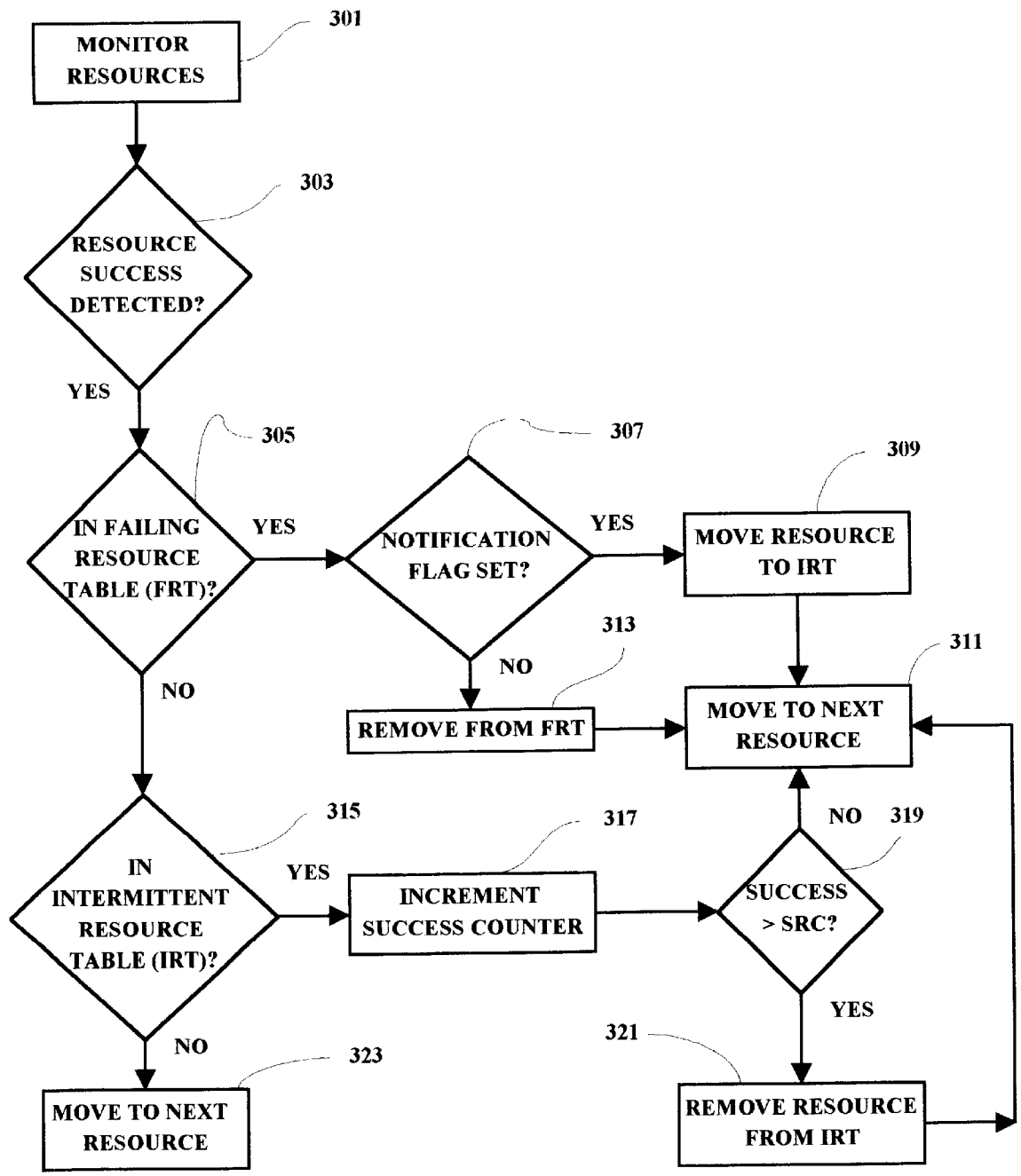
FIG. 3 is a flow chart illustrating another aspect of the disclosed methodology.

The above-described methodology is shown in flow chart form in FIG. 2 and FIG. 3. The process 201 to monitor resources begins in FIG. 2 by scanning or reading resource measurements taken from system or network resources. The resource being monitored may have resources added thereto or removed therefrom and the process may be designed to scan only those resources desired to be scanned. According to the FIG. 2 methodology, the process will continue to monitor resource readings until a failure is detected 203. In the present example, a Failure Repetition Constant FRC is defined and implemented in order to ensure that the OS is not interrupted by a merely spurious failure detection, and that successive readings confirm that the initial reading is a continuing one which requires notification to the OS and possible corrective action.

Accordingly, when a reading indicates a failure 203, a determination is made as to whether the resource is already in a Failing Resource Table FRT 205. If the resource is listed in the FRT, a check is made to determine if the detected failing condition was previously reported 207. If so, a failure counter is incremented 209 and a determination is made as to whether or not the reported number of resource failures for the particular resource being reported exceeds a predetermined Failure Repetition Constant FRC 211. If not, the process moves on to monitor the next resource 213. If, however, the number of failures exceed the FRC 211, then a determination is made as to whether a notification flag had been previously set 215. If the notification flag is already set, then the method moves on to the next resource 213. If, however, the notification flag had not been set 215, then the operating system OS is notified 217 and the notification flag is set 219 before the system returns to monitor the next resource. If the detected failing condition is not the same as one previously reported 207, then the failure count is reset, the failing resource is marked in the FRT 221 and the process returns to move to the next resource 213. Examples of failing resources include a slow or stopped cooling fan, over-voltage or under-voltage conditions or high temperature conditions.

If a detected failure or "bad" reading is for a resource that is not listed in the FRT 205, then a determination is made as to whether the resource is in an Intermittent Resource Table IRT 223. The IRT is maintained to track resources that oscillate between good and bad conditions or readings. If a resource with a detected failing condition is already listed in the IRT 223, and the failing condition is different from the one previously detected 225, then the resource is moved back to the FRT 227 since a new, previously unreported condition associated with this resource is now being reported. The predetermined numbers associated with the various constants and decision points in the present example may change depending upon the system being monitored and the design criteria. If the reported resource is in the IRT and the reported condition is the same as one previously reported, 225, then a success counter, which keeps track of successful or "good" readings for the resources, gets reset 229 and the process moves on to monitor the next resource 231. If the reported resource failure was not in the FRT 205 or the IRT 223, then the resource would be logged into the FRT 233 and the process would move to the next resource 231.

The exemplary process for handling the detected condition of an intermittent good/bad resource is illustrated in FIG. 3. The monitor process in the present example would monitor both good and bad readings. Detected bad readings would be processed as set forth above as illustrated in FIG. 2. However, when a resource has been listed as a failing resource or an intermittently failing resource, and subsequent "good" readings are detected, the process of FIG. 3 applies. The FIG. 3 process is coupled to the monitor function 301 as shown. When a "bad" or failure condition is detected 303 for a resource being monitored, the monitor function 201 is followed for processing as hereinbefore explained. However, when a success or a "good" condition or reading is detected 303, a determination is made as to whether or not the resource is in the Failing Resource Table FRT 305. If the resource is in the FRT 305, a determination is made as to whether the notification flag is set 307. If the notification flag had been set 307, then, in view of the currently reported "good" reading, the resource is moved to the IRT 309 and the process moves to the next resource 311. If however, the notification flag had not been set 307, then the resource being reported is removed from the FRT 313, and the process moves to the next resource 311.

If a "good" or successful reading is taken from a currently reporting resource 303 and the resource is not in the FRT 305, then a check is made to determine if the reporting resource is in the IRT 315. If the resource is in the IRT 315, a success counter is incremented 317 to keep track of the number of successes. If the number of success readings is not greater than a Success Repetition Constant SRC 319, the process moves to monitor the next resource 311. However, when the number of "good" or success readings becomes greater than the predetermined SRC 319, then the resource is removed from the IRT 321 since it is again considered a "good" resource, and the process moves to the next resource. Thus the method automatically reclassifies an intermittently failing resource as a good resource 321 after the number of "good" reading exceeds a predetermined number 319. Similarly, the method reclassifies a failing resource as an intermittently failing resource 309 after a series of "bad" readings 305 is followed by a "good" reading 303. When a resource reporting a "good" reading 303 is not in the FRT 305 and not in the IRT 315, then the process moves on to monitor the next resource 323.

Manipulation of the data constructs can be made to suit the needs of the operating system and the particular computer and associated network. If a user is most concerned about detection of every error, no matter how insignificant, the FRC can be made small. If operating system duty cycle and performance is the top priority, or if the computer hardware is known to be sufficiently robust to withstand small bursts or errors, then the FRC could be set accordingly high. Similarly, if the OS desires explicit knowledge about oscillating resource behavior, the SRC would be set low. If a designer wishes to minimize OS interaction, the SRC would be set high. Use of the noted constructs in the manner disclosed, ensures that the OS is notified of critical hardware problems, yet is not overwhelmed by unnecessary error reports. The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The monitoring methodology may also be implemented solely in program code stored on a disk or diskette (portable or fixed), or other memory device, from which it may be executed to monitor and/or report system resource conditions as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for monitoring selected computer resources in a computer system, said method comprising:

scanning resource measurements taken from selected ones of said computer resources;

detecting a number of continuing failures of one of said computer resources;

determining that said number of continuing failures meets or exceeds a predetermined failure repetition constant; and notifying an operating system of said detected continuing failures only after said number of failures meets or exceeds said predetermined repetition constant, whereby said operating system is not interrupted by mere spurious failure detections of selectively monitored computer resources.

2. The method as set forth in claim 1 wherein said notifying occurs only after a number of successive readings indicating said out-of-tolerance condition exceeds a first predetermined number of consecutive readings associated with one of said computer resources.

3. The method as set forth in claim 1 wherein said notifying is provided to an operating system within an information processing system.

4. The method as set forth in claim 3 wherein said computer system comprises a plurality of processing units coupled together in a network configuration.

5. The method as set forth in claim 4 wherein said network includes a host unit, said notifying being provided to an operating system operating from said host unit.

6. The method as set forth in claim 3 wherein said information processing system includes a plurality of computer resources, said method further including:

taking readings from selected ones of said computer resources in a cyclic manner so as to maintain a continuing monitoring function for said selected computer resources.

7. The method as set forth in claim 6 and further including:

making a failing resource table for storing an identification of said computer resources which have been detected to have continuing failures.

8. The method as set forth in claim 7 and further including:

identifying one of said computer resources as a good resource if a first reading indicates a second predetermined condition of said one computer resource; and moving said one computer resource from said failing resource table to an intermittent resource table if said one computer resource is listed in said failing resource table.

9. The method as set forth in claim 8 and further including:

removing said one computer resource from said intermittent resource table if a number of successive readings indicating said second predetermined condition exceeds a second predetermined constant associated with said one computer resource.

10. A method for monitoring resource conditions of a resource in an information processing system, said information processing system being arranged whereby said information processing system is not interrupted by spurious failure detections from said resource, said system including a failing resource table identifying at least one resource from which consecutive readings have been taken indicating a failing condition of said resource, said method comprising:

taking a reading from said one resource;

identifying said one resource as a good resource if said reading indicates a predetermined favorable condition of said one resource;

determining that said one resource is listed in said failing resource table; and moving said one resource from said failing resource table after said reading indicative of said predetermined favorable condition, said predetermined favorable condition being representative of an operable state of said one resource.

11. The method as set forth in claim 10 and further including:

creating an intermittent resource table, said one resource being moved to said intermittent resource table from said failing resource table after said reading indicative of said predetermined favorable condition.

12. The method as set forth in claim 11 and further including:

removing said one of said processing resources from said intermittent resource table only after a number of successive readings indicate a continuance of said favorable condition for said one resource.

13. A storage medium including machine readable indicia, said storage medium being selectively coupled to a reading device, said reading device being selectively coupled to processing circuitry within a processing system, said reading device being selectively operable to read said machine readable indicia and provide program signals representative thereof, said program signals being effective to cause said processing circuitry to monitor resource conditions of system resources coupled to said processing system and provide output signals representative of said resource conditions by performing the steps of:

scanning resource measurements taken from selected ones of said system resources;

detecting a number of continuing failures of one of said system resources;

determining that said number of continuing failures meets or exceeds a predetermined failure repetition constant; and notifying an operating system of said detected continuing failures only after said number of failures meets or exceeds said predetermined repetition constant, whereby said operating system is not interrupted by mere spurious failure detections of selectively monitored system resources.

14. A storage medium including machine readable indicia, said storage medium being selectively coupled to a reading device, said reading device being selectively coupled to processing circuitry within a processing system, said reading device being selectively operable to read said machine readable indicia and provide program signals representative thereof, said program signals being effective to cause said processing circuitry to monitor resource conditions of said processing system resources and provide output signals representative of said resource conditions, said processing system being arranged whereby said processing system is not interrupted by spurious failure detections from said processing resource, said processing system including a failing resource table identifying processing resources from which consecutive readings have been taken indicating a failing condition, said processing system being responsive to said programming signals to accomplish the steps of:

taking a reading from a first of said processing resources;

identifying said first processing resource as a good resource if said reading indicates a predetermined favorable condition of said first processing resource;

determining that said first processing resource is listed in said failing resource table; and moving said first processing resource from said failing resource table after said reading indicative of said predetermined favorable condition, said predetermined favorable condition being representative of an operable state of said first processing resource.

15. The medium as set forth in claim 14 wherein said processing system is further responsive to said program signals for:

creating an intermittent resource table, said first resource being moved to said intermittent resource table from said failing resource table after said reading indicative of said predetermined favorable condition.

16. The medium as set forth in claim 15 wherein said processing system is further responsive to said program signals for:

removing said first processing resource from said intermittent resource table only after a number of successive readings indicate a continuance of said favorable condition for said first processing resource.

17. An information processing system comprising:

a processing device;

a memory unit;

a bus connecting said processing device and said memory unit; and a system resource monitoring interface connected to said bus, said interface being selectively operable for providing readings taken from system resources, said readings being indicative of an operating condition of said system resources, said processing device being selectively operable for executing a program from said memory for:

scanning resource measurements taken from selected ones of said system resources;

detecting a number of continuing failures of one of said system resources;

determining that said number of continuing failures meets or exceeds a predetermined failure repetition constant; and notifying an operating system of said detected continuing failures only after said number of failures meets or exceeds said predetermined repetition constant, whereby said operating system is not interrupted by mere spurious failure detections of selectively monitored system resources.

18. An information processing system comprising:

a processing device;

a memory unit;

a bus connecting said processing device and said memory unit; and a system resource monitoring interface connected to said bus, said interface being selectively operable for providing readings taken from system resources, said readings being indicative of an operating condition of said system resources, said information processing system being arranged whereby said information processing system is not interrupted by spurious failure detections from said system resources, said information processing system including a failing resource table identifying system resources from which consecutive readings have been taken indicating a failing condition, said processing device being selectively operable for executing a program from said memory for:

taking a reading from one of said system resources;

identifying said one system resource as a good resource if said reading indicates a predetermined favorable condition of said one system resource;

determining that said one system resource is listed in said failing resource table; and moving said one system resource from said failing resource table after said reading indicative of said predetermined favorable condition, said predetermined favorable condition being representative of an operable state of said one resource.

19. A method for monitoring operating status of at least one resource within an information processing system, said method comprising:

receiving readings from said one resource, said readings being representative of detected operational states of said one resource;

providing indicia representative of detected in-tolerance and out-of-tolerance operational states of said one resource;

maintaining a memory of said indicia;

changing said memory automatically between said first and second states in accordance with said operational states; and providing notice of an out-of-tolerance condition of said one resource only after a succession of at least two detections of said out-of-tolerance condition, whereby said information processing system is not interrupted by mere spurious failure detections of selectively monitored system resources.

* * * * *